(12) United States Patent
Paiam

(10) Patent No.: US 6,587,615 B1
(45) Date of Patent: Jul. 1, 2003

(54) WAVELENGTH MULTIPLEXER-DEMULTIPLEXER HAVING A WIDE FLAT RESPONSE WITHIN THE SPECTRAL PASSBAND

(75) Inventor: Reza Paiam, Ottawa (CA)

(73) Assignee: JDS Fitel Inc., Ottawa (CA)

( * ) Notice: Subject to any disclaimer, the term of this patent is extended or adjusted under 35 U.S.C. 154(b) by 0 days.

(21) Appl. No.: 09/309,488

(22) Filed: May 11, 1999

(51) Int. Cl.$^7$ .................................................. G02B 6/28

(52) U.S. Cl. ............................ 385/24; 385/31; 385/39; 359/127

(58) Field of Search ................................ 359/578, 615, 359/115, 121, 124, 127, 341, 337; 372/20; 356/352; 385/20, 21, 14–17, 24, 28, 45, 39, 46, 31, 129–132, 147, 37, 48, 43, 12

(56) References Cited

U.S. PATENT DOCUMENTS

| | | | | |
|---|---|---|---|---|
| 4,786,133 A | | 11/1988 | Gidon et al. ............. 350/96.19 |
| 5,428,698 A | * | 6/1995 | Jenkins et al. ................. 385/27 |
| 5,488,680 A | | 1/1996 | Dragone ....................... 385/24 |
| 5,689,597 A | | 11/1997 | Besse ........................... 385/39 |
| 5,862,279 A | | 1/1999 | Amersfoort et al. .......... 385/40 |
| 5,862,288 A | * | 1/1999 | Tayag et al. ................. 385/129 |
| 6,047,096 A | * | 4/2000 | Augustsson .................. 385/37 |
| 6,058,233 A | * | 5/2000 | Dragone ....................... 385/46 |
| 6,091,870 A | * | 7/2000 | Eldada .......................... 385/37 |
| 6,094,513 A | * | 7/2000 | Rigny et al. .................. 385/24 |
| 6,144,494 A | * | 11/2000 | Shirasaki et al. ............ 359/578 |
| 6,178,276 B1 | * | 1/2001 | Mackie et al. ................ 385/28 |

FOREIGN PATENT DOCUMENTS

| | | | |
|---|---|---|---|
| EP | 0 901 024 A2 | 3/1999 | ........... G02B/6/293 |
| JP | 63253903 | 10/1988 | ............ G02B/6/00 |
| WO | WO 98/04944 | 2/1998 | ............ G02B/6/34 |
| WO | WO 99/12297 | 3/1999 | ............ H04J/14/02 |

OTHER PUBLICATIONS

M.R. Amersfoort et al. "Phased Array wavelength demultiplexer with flattened wavelength response" *Electronics Letters*, vol. 30, No. 4, pp. 300–302, Feb. 1994.

J.B.D. Soole et al., Use of multimode interference couplers to broaden the passband of wavelength–dispersive integrated WDM filters: *IEEE Photonics Technology Letters*, vol. 8, No. 10, pp. 1340–1342, Oct. 1996.

K. Okamoto and A. Sugita, "Flat spectral response arrayed–waveguide grating multiplexer with parabolic waveguide horns", *Electronics Letters*, vol. 32, No. 18, pp. 1661–1662, Aug. 1996.

Y.P. Ho, H. Li, and Y.J. Chen, "Flat channel–passband–wavelength multiplexing and demultiplexing devices by multiple–Rowland–circle design" *IEEE Photonics Technology Letters*, vol. 9, No. 3, pp 342–344, Mar. 1997.

K. Okamoto and H. Yamada, "Arrayed–waveguide grating multiplexer with flat spectral response" *Optics Letters*, vol. 20, No. 1, pp. 43–45 Jan. 1995.

(List continued on next page.)

*Primary Examiner*—Frank G. Font
*Assistant Examiner*—Michael P. Mooney
(74) *Attorney, Agent, or Firm*—Neil Teitelbaum

(57) ABSTRACT

A wavelength demultiplexer having a substantially flat output response within its passband is disclosed. The demultiplexer comprises a first wavelength demultiplexer optically coupled to a second wavelength demultiplexer. The first wavelength demultiplexer has a free spectral range approximately equal to channel spacing of the second wavelength demultiplexer thereby providing the substantially flat output response within the passband. The first wavelength demultiplexer is a resonant optical cavity, absent distinct output ports, and light propagating between the first wavelength demultiplexer and the second wavelength deimultiplexer is unguided. The absence of distinct output ports in the first wavelength demultiplexer reduces ripples in the substantially flat output response within the passband. Alternatively, the first wavelength demultiplexer is replaced by an MMI-phasar.

15 Claims, 9 Drawing Sheets

OTHER PUBLICATIONS

G.H.B. Thompson et al., "An original low–loss and pass–band flattened SiO$_2$ on Si planar wavelength demultiplexer" *OFC '98 Technical Digest*, p. 77, Feb. 1998.

M.R. Paiam and R.I. MacDonald, "Design of phased–array wavelength division multiplexiers using multimode interference couplers" *Applied Optics* vol. 36, No. 21. pp. 5097–5108, Jul. 1997.

M. Shirasaki "Large angular dispersion by a virtually imaged phased array and its application to a wavelength demultiplexer" *Optics Letters*, vol. 21, No. 5, pp. 366–368, Mar. 1996.

M. Shirasaki "Chromatic–dispersion compensator using virtually imaged phased array" *IEEE Photonics Technology Letters*, vol. 9, No. 12, pp 1598–1600, Dec. 1997.

F. Gires and P. Tournois, "Interferometre utilisable pour la compression d'impulsions luminouses modulees en frequence" *C.R. Acad Sc. Paris*, t. 258, pp. 6112–6115, Jun. 1964.

M.A. Duguay and J.W. Hansen, "Compression of pulses from a mode–locked He–Ne Laser" Applied Physics Letters, vol. 14, No. 1, pp. 14–16, Jan. 1, 1969.

"Large Angular Dispersion by a Virtually imaged phased array and its application to a wavelength demultiplexer" Shirasaki 1996 Optical Society of America Optics Letters, Mar. 1, 1996, vol. 21, No. 5, pp. 366–368.

\* cited by examiner-

WAVELENGTH MULTIPLEXER-DEMULTIPLEXER HAVING A WIDE FLAT RESPONSE WITHIN THE SPECTRAL PASSBAND

FIELD OF THE INVENTION

This invention relates to an optical interconnection apparatus that is capable of optical switching and/or multiplexing/demultiplexing functions.

BACKGROUND OF THE INVENTION

Fiber optic communication is becoming ubiquitous. Advantages to using fiber optic communications are well known and each year more users require increasing bandwidth to transmit ever-increasing amounts of information. Unfortunately at present, the cost of installing, "laying," new fiber is prohibitive. Hence, it would be greatly advantageous to be able to pass greater amounts of information through existing fiber optic networks. Wavelength division multiplexing is an effective method of exploiting the large bandwidth of optical fibers. In addition to increasing the transmission capacity of a point-to-point link, wavelength division multiplexing is also becoming important in optical networks for routing and circuit switching.

Fiber optic networks require optical multiplexers-demultiplexers. A multiplexer-demultiplexer is capable of functioning as a multiplexer or a demultiplexer. A demultiplexer separates a single multi-wavelength beam of light, a spectrum of light, into a plurality of beams each comprising a component wavelength of the multi-wavelength beam of light, and a multiplexer combines a plurality of light beams having different wavelengths into a single multi-wavelength beam of light.

An optical wavelength multiplexer-demultiplexer has a passband. The passband is a portion of light having wavelengths between first and second limiting wavelengths that are transmitted with minimum relative loss. An optical multiplexer-demultiplexer is designed to have a minimum attenuation, or alternatively stated a maximum transmitence, for a particular wavelength band. Notwithstanding intended design, multiplexer-demultiplexers generally do not have a constant transmitence. The transmitence of the device is wavelength dependent and periodic. Often, there is an undulated effect to the output response within the passband. Flattening of the output response within the passband of wavelength demultiplexers is desirable because it relaxes the requirements on the wavelength control of optical sources.

Some known multiplexers do not efficiently provide a flat output response within their passbands. U.S. Pat. No. 5,412,744 entitled "Frequency Routing Device Having Wide and Substantially Flat Passband" by Corrado Dragone, issued May 2, 1995, discloses a frequency routing device in which a flat output response within the passband is achieved by combining a routing device with an optical coupler. This document and all references therein are herein incorporated by reference. One limitation of this device, however, is an inherent loss of optical power due to the presence of the coupler.

U.S. Pat. No. 5,488,680 entitled "Frequency Routing Device Having Wide and Substantially Flat Passband" by Corrado Dragone, issued Jan. 30, 1996, discloses a frequency, routing device in which a flat output response within the passband is achieved by coupling a first frequency routing device to a second frequency routing device. The output light from the first frequency routing device is launched into a second frequency routing device having a wavelength channel spacing equal to the free spectral range of the first device to provide a, substantially flat output response within the passband. A ripple in the substantially flat output response is generally undesirable, though present in the above mentioned devices. In addition, the solution disclosed in U.S. Pat. No. 5,488,680 does not lend itself to bulk optics.

Precise synchronism between the spectral responses of the first frequency routing device and the second frequency routing device as disclosed in U.S. Pat. No. 5,488,680 is required for effective implementation of the technique. It would be advantageous if it was possible to tune the spectral responses of the first frequency routing device and the second frequency routing device, which are cascaded together, independently. In the case where the two cascaded frequency routing devices are present on a same integrated chip, it would be difficult to tune the spectral responses of the two devices independently after fabrication. It is also noteworthy that in frequency routing devices such as Arrayed Waveguide Grating (AWG) devices employed by Dragone a fraction of power routed through the devices is diffracted into higher orders resulting in losses. Moreover, it is necessary to reduce crosstalk by blocking the optical power diffracted into the higher orders in a first Arrayed Waveguide Grating from entering a second Arrayed Waveguide Grating, as disclosed in an article in Technical digest Tuesday, Feb. 24, 1998, page 77, by Thompson, G. H. B. et al. For the aforementioned reasons implementation of the device of the devices disclosed in U.S. Pat. No. 5,488,680 are complex.

In addition, manufacture of integrated devices as disclosed in U.S. Pat. No. 5,488,680 is difficult because the integrated devices are lengthy and intricate. It would be advantageous to reduce ripple in the output response within the passband. It would also be advantageous to have a device that is manufactured economically, provides a substantially flat output response having reduced ripple over prior art devices within its passband. It would also be advantageous to reduce higher orders within the output response and to provide tunability of the device.

SUMMARY OF THE INVENTION

In accordance with the invention there is provided a wavelength multiplexer-demultiplexer comprising: a first routing device having a first input port for launching a multi-wavelength beam of light having at least n wavelengths into the first routing device, wherein n is greater than 1, and a first output port for exiting sub-beams generated by the first routing device from the multi-wavelength beam of light, and having an output response with a free spectral range; a second routing device having a second input port for receiving sub-beams exiting the first output port, a second output port, and a spectral response for providing a wavelength channel spacing, the second input port optically coupled to the first output port to provide a light coupling absent substantial mode mismatch.

The first routing device for providing a free spectral range that is approximately equal to the wavelength channel spacing provided by the second routing device.

According to an embodiment the first routing device comprises a resonant optical cavity having a forward and a rearward spaced apart reflective surface; the first input port for launching a multi-wavelength beam of light having at least n wavelengths into the resonant optical cavity is such that the beam is incident upon one of the reflective surfaces of the resonant optical cavity at an angle that is non-orthogonal to said reflective surface, the forward reflective surface being partially transmissive, so that a portion of the beam exits the forward partially transmissive surface as subbeams at a plurality of locations along the forward partially transmissive surface as the beam follows a zig-zag path between the forward and rearward surfaces.

In accordance with the invention there is further provided a wavelength multiplexer-demultiplexer comprising: a first routing device comprising a first port and a second port, the first routing device having an output response with a free spectral range, wherein a portion of light launched into the first port exits the second port at a location dependent upon a wavelength of the portion of light, a plot of location versus wavelength substantially defining a saw tooth function; and a second routing device comprising an input port and an output port, the second routing device having a spectral response with a channel spacing approximately equal to the free spectral range of the first device, wherein the input port of the second routing device is optically coupled to the output port of the first routing device for routing unguided light from the second port of the first routing device to the input port of the second routing device.

BRIEF DESCRIPTION OF THE DRAWINGS

Exemplary embodiments of the invention will now be described in conjunction with the following drawings, in which:

FIG. 8b is a schematic illustration of a tapered multimode interference coupler of an MMI-phasar multiplexer of FIG. 7a.

In the following detailed description of the invention, the same numbering is used in different figures to designate similar components.

DETAILED DESCRIPTION OF THE PREFERRED EMBODIMENTS OF THE INVENTION

Figure 1:
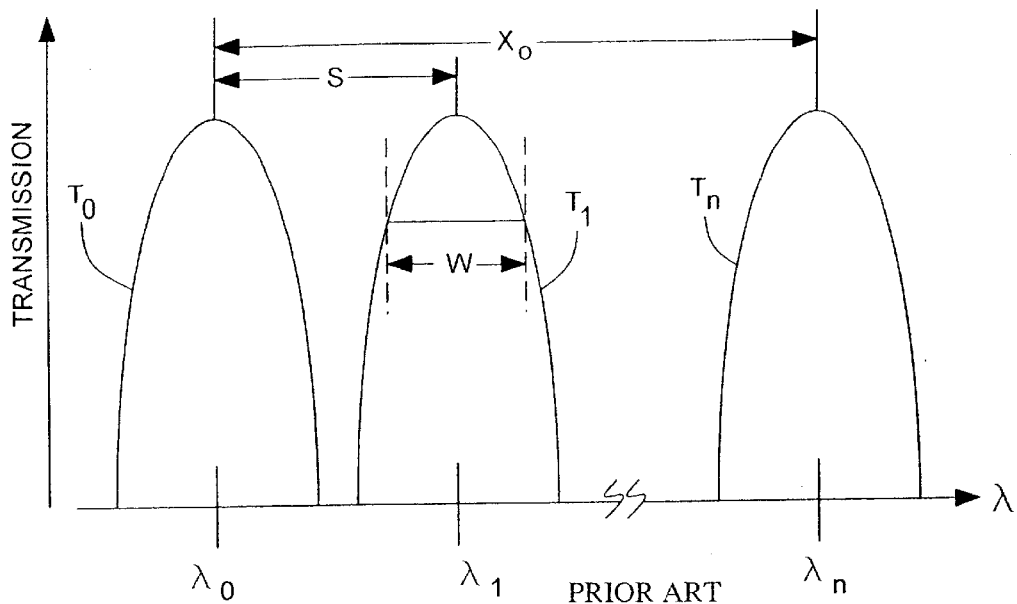
FIG. 1 illustrates a graph of output response, transmitence, as a function of wavelength for a prior art routing device having an undulated output response within the passband.

Referring to FIG. 1, the typical wavelength dependent routing characteristics of a routing device such as a Mach-Zehnder Interferometer are illustrated in the form of a plot of transmittance Tn as a function of wavelength $\lambda$ for a particular input port of a routing device. The channel spacing S is defined as the wavelength separation between wavelengths of maximum transmittance. The variation of transmittance as a function of wavelength is essentially periodic with a period $X_0$, which is referred to as the free spectral range (FSR) of the device. The wavelengths $\lambda_0$, $\lambda_1, \ldots \lambda_n$ are of maximum transmittance and are referred to as the center wavelengths. Each center wavelength is within a passband of wavelengths, the passband having the central wavelength and peripheral wavelengths at each side of the central wavelength.

In a conventional routing device, the channel spacing S is chosen to be large enough to ensure negligible crosstalk between different output ports. Thus, in the vicinity of a particular center wavelength such as $\lambda_0$, transmittance of other wavelengths $\lambda_1, \ldots \lambda_n$ is negligible. The transmittance of differing wavelengths are typically designed to be essentially non-overlapping. The above-described conventional frequency routing device has an undesirable feature; namely, that the passband is not flat over its entire width W.

Figure 2A:
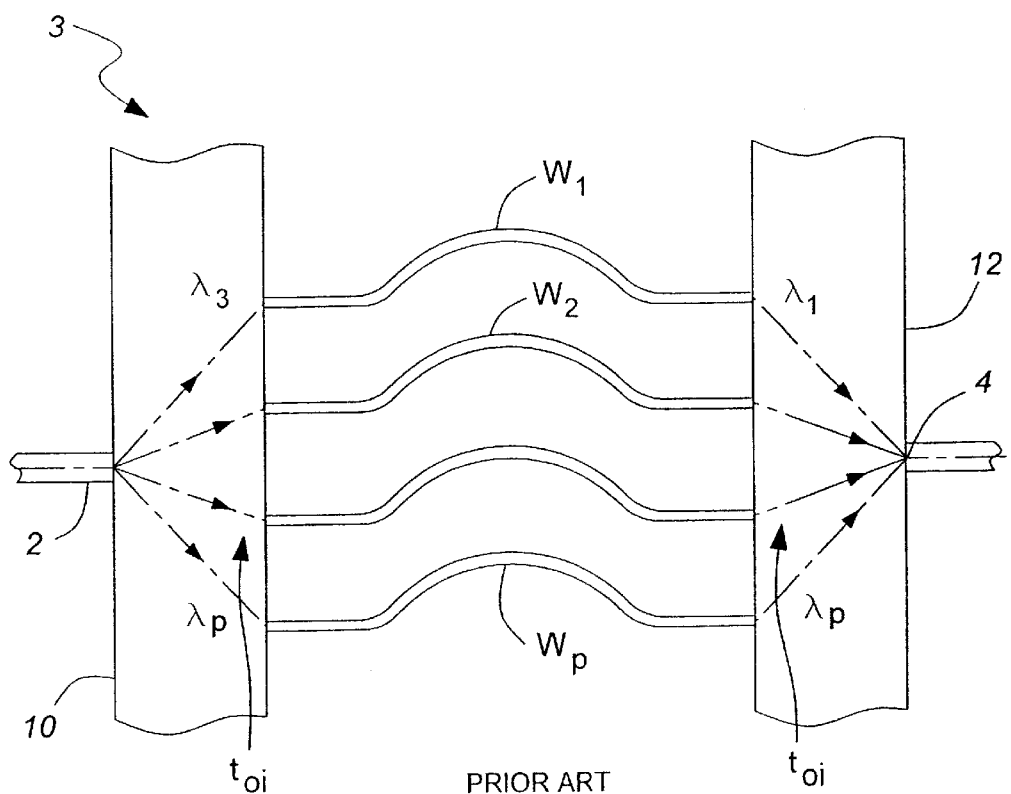
FIG. 2a is a schematic illustration of a prior art device in which a first frequency routing device is optically coupled to a second frequency routing device.

FIG. 2a illustrates a prior art frequency routing device 3 comprised of a first frequency routing device 10 optically coupled by a plurality of waveguides to a second frequency routing device 12. For the purposes of illustration only, each routing device is configured as a 1×N routing device. However, in general, the two routing devices may have differing numbers of input and output ports, and P of the N output ports of the first routing device are optically coupled in series to P of the N input ports of the second routing device via a series of waveguides $W_1, W_2, \ldots, W_p$. The value of P may be equal to or less than the value of N. The first frequency routing device 10 and the second frequency routing device 12 are configured to transmit P distinct center wavelengths $\lambda_1, \lambda_2, \ldots \lambda_p$.

In operation, the first routing device 10 demultiplexes a signal directed to its input port 2. If a multiplexed signal composed of wavelengths $\lambda_1, \lambda_2, \ldots \lambda p$ is directed to input port 2 of the first routing device 10, each wavelength will be directed to a respective one of the waveguides $W_1, W_2, \ldots$ Wp. The transmission lines then direct the wavelengths to input ports of the second routing device 12, which multiplexes the wavelengths so that they appear on output port 4. When a free spectral range, $X_0$, of the first frequency routing device 10 is approximately equal to a wavelength channel spacing, S, of the second frequency routing device 12, a substantially flat output response within the passband is obtained.

Figure 2B:
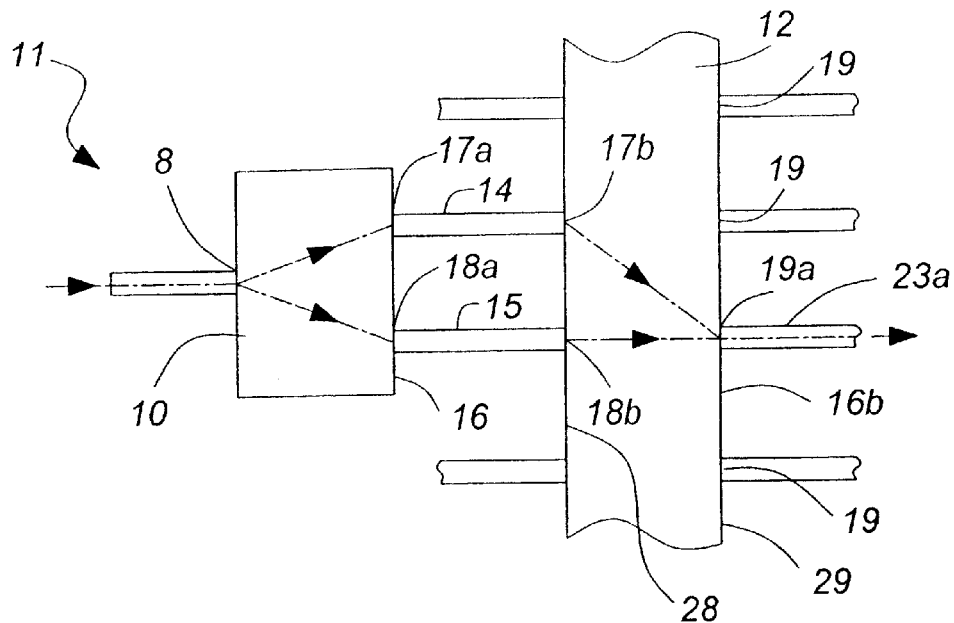
FIG. 2b is a schematic illustration of a prior art device in which a first frequency routing device is optically coupled to a second frequency routing device.

FIG. 2b illustrates a prior art frequency routing device comprised of a first frequency routing device optically coupled by a plurality of waveguides to a second frequency routing device. The waveguides provide a spatially intermittent light coupling across an output face 16 of the first frequency routing device. Since the waveguides couple light from portions of the output face 16 and not from the entire output face 16 or a contiguous portion thereof, a region that does not allow light to efficiently propagate into the second frequency routing device results. The prior art frequency routing device 11 comprises a first frequency routing device in the form of a 1×2 frequency routing device 10 optically coupled by two waveguides 14 and 15 to a second frequency routing device in the form of an N×N frequency routing device 12, where N is greater than 2. In the same manner to the prior art frequency routing device 3, when a free spectral range, $X_0$, of the 1×2 frequency routing device 10 is approximately equal to a wavelength channel spacing, S, of the N×N frequency routing device 12, a substantially flat output response within the passband is obtained.

In operation, a beam of light having at least n wavelengths is launched into an input port 8 of the 1×2 frequency routing device 10. For ease of description, the beam of light is considered composed of two wavelengths $\lambda_1$ and $\lambda_2$, and the difference in wavelength between $\lambda_1$ and $\lambda_2$ is equal to approximately half the free spectral range, $X_0$, of the 1×2 frequency routing device. The 1×2 frequency routing device 10 has a high transmittance for routing $\lambda_1$ to output port 17a and low transmittance for routing $\lambda_1$ to output port 18a. The 1×2 frequency routing device 10 has a low transmittance for routing $\lambda_2$ to the output port 17a and high transmittance for routing $\lambda_2$ to the output port 18a. Hence, the 1×2 frequency routing device 10 routes light of each wavelength $\lambda_1$ and $\lambda_2$ to two distinct spatial regions on output face 16. The two distinct spatial regions approximately correspond to the output ports 17a and 18a that are optically coupled to waveguides 14 and 15, respectively. The 1×2 frequency routing device 10 performs a demultiplexing role. The waveguides 14 and 15 route light of each wavelength $\lambda_1$ and $\lambda_2$ into the N×N frequency routing device 12 via the input ports 17b and 18b, respectively. The presence of the waveguides 14 and 15 optically coupling the 1×2 frequency routing device 10 to the N×N frequency routing device 12 induces a mode mismatch at wavelengths where light propagates in more than one waveguide. The mode mismatch results in a reduction in transmittance of light between the 1×2 frequency routing device 10 and the N×N frequency routing device 12. The reduction in transmittance of light in the prior art frequency routing device 11 is determined by differing factors. An optical field at the input face 28 of the N×N frequency routing device 12 is imaged forming an image field at its output face 29. Light of wavelengths $\lambda_1$ or $\lambda_2$ propagate wholly in waveguide 14 or waveguide 15, and there is no mode mismatch between the imaged field and the mode-field at the output ports 19 of the N×N frequency routing device 12 and loss of light intensity is at minimum. However, light launched into the input port 8 having a wavelength in the range between $\lambda_1$ and $\lambda_2$, after passing through the 1×2 frequency routing device 10, is divided between both waveguides 14 and 15 in a ratio which is dependent upon the wavelength. The consequent mode mismatch between the imaged field, and the mode-field at the output ports 19 of the N×N frequency routing device 12 results in a loss of light intensity. It is possible to reduce mode mismatch by bringing the output "ports" of the first routing device closer together as will become apparent in the discussion of FIG. 8a and 8b. In the specification and claims that follow, the term mode mismatch is used to refer to this reduction in transmittance caused by optically coupling a first frequency routing device to a second frequency routing device by waveguides. In FIG. 2b, the N×N frequency routing device 12 is optically coupled to the 1×2 frequency routing device 10 to provide a light coupling with substantial mode mismatch. Referring to FIG. 1, wavelength $\lambda_1$ is central to a band of wavelengths at a maxima thereof. Output ports of the 1×2 frequency routing device 10 are manufactured such that the center of each output port is at a position incident with such a maxima. When $\lambda_1$ is routed central to output port 17a of the 1×2 frequency routing device 10 about the vicinity of $\lambda_1$ there are a series of wavelengths that are also routed non-centrally into the output port 17a. In contrast to the 1×2 frequency routing device 10, which performs a demultiplexing role, the N×N frequency routing device 12 performs a multiplexing role within each channel and a demultiplexing role between channels. Light at each of two wavelengths $\lambda_1$ and $\lambda_2$ is routed from two individual input ports 17b and 18b respectively to a particular output port 19a. The output port 19a is optically coupled to a waveguide 23a. For a more detailed description of the prior art discussed in FIG. 2a and FIG. 2b the reader is directed to U.S. Pat. No. 5,488,680.

Figure 3:
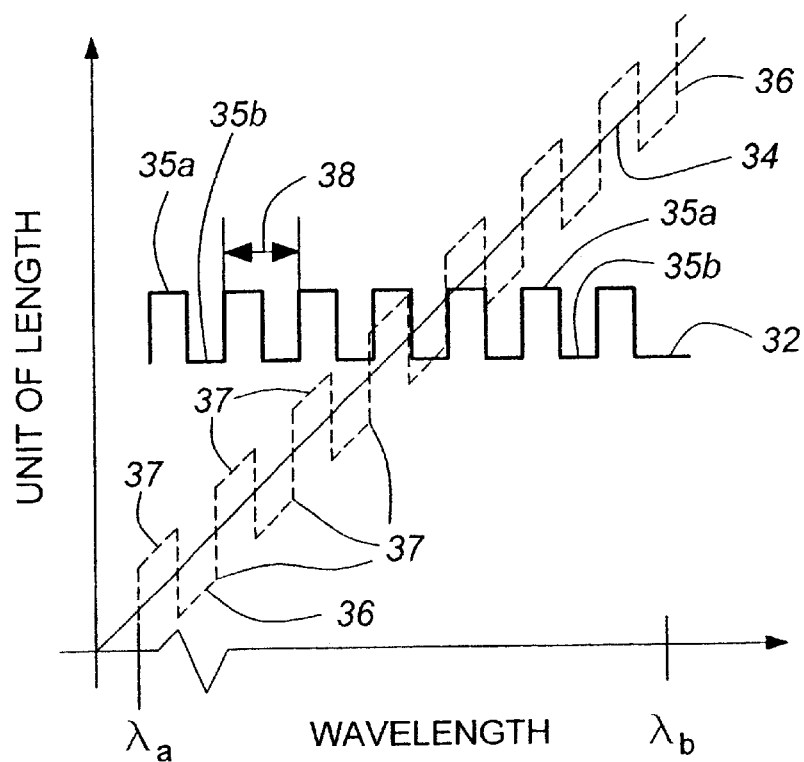
FIG. 3 illustrates graphically a combination of a dispersion plot for the first routing device of FIG. 2 with a dispersion plot for the second routing device of FIG. 2 to produce a local maxima within a passband.

FIG. 3 is present for discussion purposes and is an over-simplification of dispersion curves and their combination. FIG. 3 illustrates dispersion of light having differing wavelengths propagating through a prior art routing device. Individual plots for the first and second routing devices are shown as is a plot of a combination of the two. It is the combined dispersion that defines the nature of the passband for the entire device. Theoretical dispersion plots 32, 34 and 36 illustrate a position of light in unit of length versus wavelength. The dispersion plot 32 is for the 1×2 frequency routing device 10 which is highly dispersive. A value along the unit of length axis for the dispersion plot 32 corresponds to a position of the output face 16 of the 1×2 frequency routing device 10. The plot 32 describes a repeating step dispersive wavelength dependent function. The function repeats over its free spectral range, $X_0$. Over a range equal to the free spectral range two steps having a width shown at 38 occur. Each of the two steps 35a and 35b corresponds to one of output ports 17a and 18a on the output face 16. The dispersion plot 34 is for the N×N frequency routing device 12. The unit of length for the dispersion plot 34 corresponds to a position on the output face 29. The wavelength channel spacing, $X_0$, of the N×N frequency routing device 12, over a range $\lambda_a$ to $\lambda_b$, is approximately equal to the free spectral range, S, of the 1×2 frequency routing device 10. In this regard, the 1×2 frequency routing device 10 is "highly" dispersive in comparison to the dispersivity of the N×N frequency routing device 12. It is evident from FIG. 3 that the N×N frequency routing device 12 provides a substantially linear wavelength dispersion.

A combination of the individual dispersion plots 32 and 34 results in the dispersion plot 36. The dispersion plot 36 describes a step function having two local maxima 37 within each free spectral range of the 1×2 frequency routing device 10. The dispersion plot 36 represents a device with a substantially flat output response having two local maxima, ripples, in each passband.

Figure 4A:
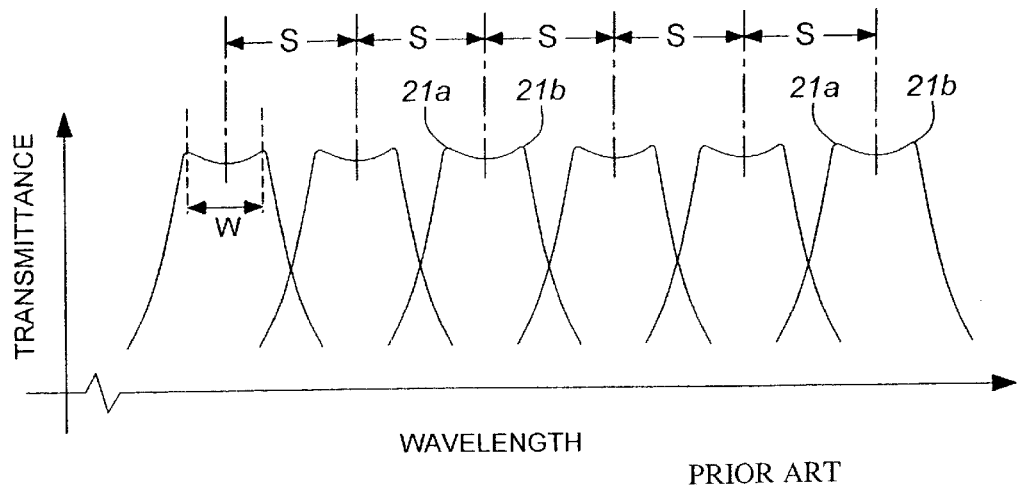
FIG. 4a illustrates typical passband characteristics of a prior art routing device.

Referring to FIG. 4a, typical wavelength dependent routing characteristics of a frequency routing device such as the prior art frequency routing device 11 are shown. FIG. 4a shows transmittance as a function of wavelength λ for a multi-wavelength beam of light launched into input port 8. A series of passbands are shown each spaced at a channel spacing S. Whilst each passband is relatively flat over its entire width W, each passband has a ripple. The ripple is a result of two local transmittance maxima 21a and 21b within the passband. The two local transmittance maxima 21a and 21b are a consequence of the 1×2 frequency routing device 10 having two output ports 17a and 18a.

Figure 4B:
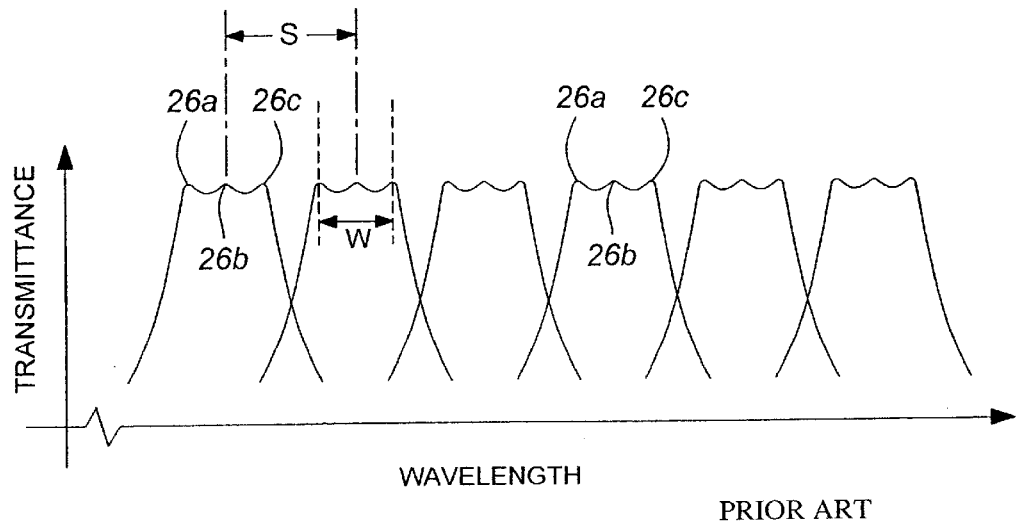
FIG. 4b illustrates typical passband characteristics of a prior art routing device.

Referring to FIG. 4b, typical wavelength dependent routing characteristics of another frequency routing device wherein three waveguides couple a first frequency routing device to a second frequency routing device are shown. The frequency routing device comprises a 1×3 frequency routing device optically coupled by three waveguides to an N×N frequency routing device. A plot of wavelength routing characteristics is similar to that shown in FIG. 3a; however, each passband within the plot has a ripple with three local transmittance maxima 26a, 26b, and 26c.

The number of output ports of the first frequency routing device/interconnecting waveguides determines, in part, the number of ripples in the passband. As the number of output ports approaches infinity, the ripple will substantially disappear. It has now been found that it is advantageous to remove the limitation of distinct individual output ports of the first device. In FIG. 2, the 1×2 frequency routing device 10 serves to route light of differing wavelengths to a second frequency routing device via waveguides. It has been found that a resonant optical cavity has advantages over the 1×2 frequency routing device 10. In particular, the resonant optical cavity provides a continuous output across an output "port" or region thereof. Since portions of the light passed from the first frequency routing device to the second frequency routing device are not intermittent across the space of the output region, mode mismatch effects are minimised. This effectively reduces the losses associated with mode mismatch.

Figure 5:
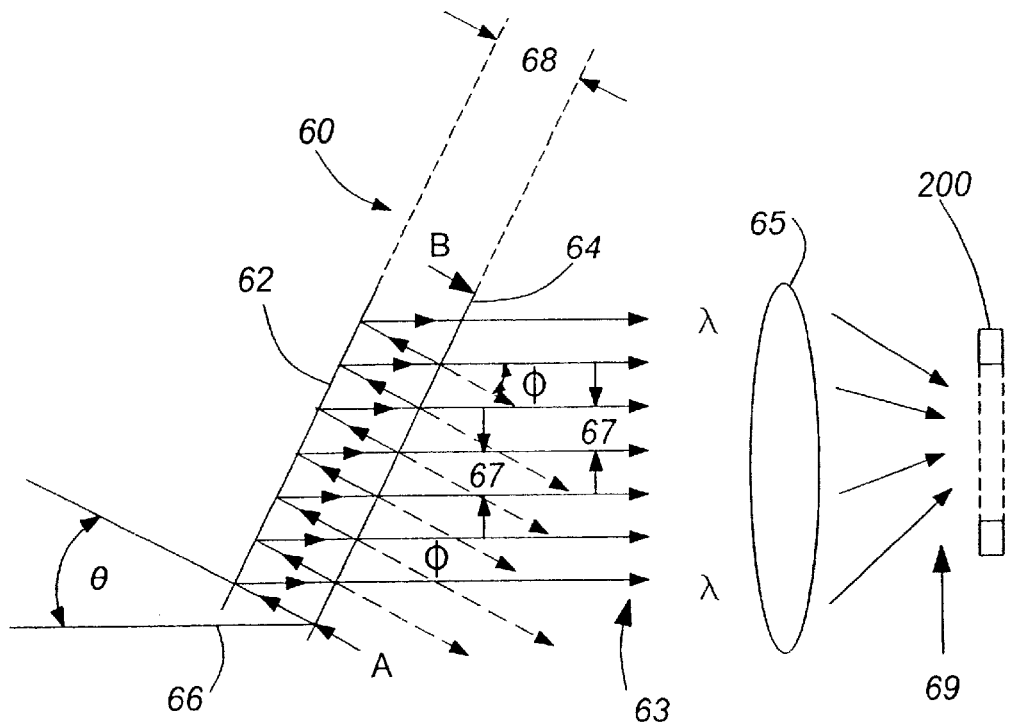
FIG. 5 is a schematic illustration of a resonant optical cavity according to the present invention.

Referring to FIG. 5, a resonant optical cavity 60 and a focussing lens 65 are shown which according to the present invention are optically coupled to a second frequency routing device. However, for ease of explanation the resonant optical cavity 60 and the focussing lens 65 are described below without a second routing device. The resonant optical cavity 60 functions as a highly dispersive virtually-imaged phased array comprising: a rearward reflective surface 62; a forward reflective surface 64, the forward reflective surface 64 being partially transmissive; and an input port 66 for launching a multi-wavelength beam of light between the rearward reflective surface 62 and the forward reflective surface 64. A description of the theory of such a resonant optical cavity functioning as a highly dispersive virtually-imaged phased array is presented by Shirasaki, in "Large Angular Dispersion by a virtually Imaged Phase Array and its Application to a Wavelength Demultiplexer" *Optics Letters*, Vol. 21, No. 5, pp. 1598–1600, Dec. 1997. The reflective surfaces 62 and 64 are substantially parallel to one another and define a spacing 68. It is preferred that the rearward reflective surface 62 has a reflectivity of approximately 100% and the forward reflective surface 64 has a reflectivity of greater than approximately 90%. It is most preferred that the forward reflective surface 64 has a reflectivity of greater than approximately 95%. In operation, a beam of light is launched into the input port 66 such that the beam is incident upon the forward reflective surface 64 at an angle θ that is non-orthogonal to the forward reflective surface 64. In a preferred embodiment, the angle θ is in the range of approximately 1° to approximately 10°.

The beam of light is reflected by the forward reflective surface 64 to the rearward reflective surface 62 and subsequently reflected by the rearward reflective surface 62 back to the forward reflective surface 64 and so forth. In this manner, the beam of light defines a zigzag path between the forward reflective surface 62 and rearward reflective surface 64. Each time the beam of light is reflected by the forward reflective surface 64, a portion of the light beam exits the forward partially transmissive surface as sub-beams 63 at a point of incidence along the forward partially transmissive surface. Alternatively, the beam of light is launched such that the beam is incident upon the rearward reflective surface 62 at an angle θ and defines a zigzag path between the rearward reflective surface 62 and the forward reflective surface 64.

Illustrated is a single exiting set of sub-beams 63. The exiting set of sub-beams 63 defines an angle φ to the incident beam. Each sub-beam 63a has an adjacent sub-beam 63a and the distance between adjacent sub-beams 63a defines a distance 67. However, there are different sets of sub-beams 63 exiting the forward reflective surface 64, each set of sub-beams 63 defining a different angle $\phi_n$ to the forward incident beam. The sub-beams of each set are focused by the focussing lens 65 to yield a focused spectrum of sub-beams 69 which, as shown, are unguided. In a preferred embodiment, the focused spectrum of sub-beams 69 passes through an iris 200 which limits the passage of higher orders of light to a second routing device. Higher orders of light result in cross talk and loss of light power. The iris 200 reduces cross talk. An MMI-phasar does not generate higher orders of light in contrast to the resonant optical cavity 60.

The focusing lens 65 is positioned sufficiently close to the resonant optical cavity 60 to capture substantially all light propagating at differing angles $\phi_n$. The focussing lens 65, by virtue of its shape and/or distance from the second routing device, focuses distinct beams of light of differing wavelength into the second routing device with a specific distance separation therebetween. By tuning the specific distance separation, ripples induced into the passband of the transmission response by local transmission maxima are reduced. In contrast to the first routing device of FIG. 2, the resonant optical cavity 60 does not have a plurality of distinct output ports. In an embodiment, the forward reflective surface 64 and rearward reflective surface 62 have an optically transmissive material therebetween. It is preferred that the optically transmissive material has a low thermal coefficient of expansion. In such an embodiment, the thickness of the optically transmissive material defines the spacing 68 between the forward reflective surface 64 and rearward reflective surface 62. The free spectral range of the resonant optical cavity 60 is inversely proportional to the spacing 68. Hence, by selecting a material with a low thermal coefficient of expansion, the free spectral range of the resonant optical cavity 60 is less sensitive to temperature variation. Of course, when the material is selected so as to be substantially internally reflective at the angle θ, the reflective surfaces are formed by an interface between outer surfaces of the optically transmissive material and an adjacent substance, for example air. Refraction and its use in forming reflective surfaces and partially reflective surfaces is well known in the art. Commonly, dielectric films disposed on the optically transmissive material provide reflective surfaces.

Alternatively, the forward reflective surface 64 and rearward reflective surface 62 have an optically transmissive material, which has a high coefficient of thermal expansion or thermooptic coefficient δn/δt) therebetween. In this embodiment, it is possible to control the temperature of the optically transmissive material that has a high thermooptic coefficient, such that it is possible to tune the FSR of the resonant optical cavity 60.

One skilled in the art will understand that the nature of the input port 66 is not at the essence of the invention. In an embodiment, the input port 66 is at location on a surface of the optically transmissive material absent a reflective surface thereon, a reflective coating, allowing light to enter between the forward reflective surface 64 and rearward reflective surface 62. In an alternative embodiment, the input port 66 is achieved through index matching of the optically transmissive material and material through which light is provided to the optically transmissive material. It is preferred that there is a distinct boundary between the reflective surface and the input port 66. In an embodiment, removing a small portion of the reflective surface and fixing an optically transmissive window to the optically transmissive material with index-matching glue provides the input port 66. It is preferred that the window has an antireflection coating. Alternatively, the input port 66 is an area between the forward reflective surface 64 and the rearward reflective surface 62 into which a beam of light is launched. In another embodiment, a Selfoc™ lens attached to the optically transmissive material provides the input port 66.

As is appreciated by one skilled in the art, the free spectral range of the resonant optical cavity is determined based on the spacing 68 between the forward reflective surface 64 and the rearward reflective surface 62; The larger the spacing 68 the smaller the free spectral range and the higher the dispersion of the resonant optical cavity 60.

The resonant optical cavity 60 and a focussing lens 65 are bulk optic components. Generally, bulk optic components are more easily optically coupled to other bulk optic components than integrated optics. However, it is possible to manufacture the resonant optical cavity 60 and the focussing lens 65 for coupling to integrated optical components; the focussing lens 65, or an equivalent thereof, focuses light into an integrated waveguide. Alternatively, light emerging from an integrated optical component is launched into the resonant optical cavity 60. In this manner, a transition from bulk optics to integrated optics is achieved. In another embodiment, the focussing lens 65 focuses light into an integrated optical component other than an integrated waveguide, for example a free space region of an integrated multiplexer-demultiplexer.

The free spectral range of the resonant optical cavity 60 is determined, for example, by the following equation:

$$FSR = c\ \text{Cos}\ \theta/(2t[n - \sin^2\theta]),$$

in which n is the index of refraction of the optically transmissive material, t is the distance between the forward reflective surface 64 to the rearward reflective surface 62, θ is the angle between the input light and the normal to the plate, and c is the velocity of light in a vacuum.

Figure 6A:
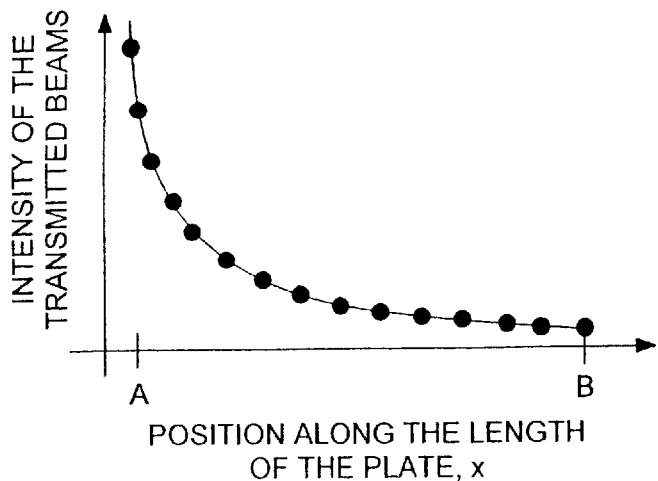
FIG. 6a is a graph illustrating light intensity distribution emerging from a forward reflective surface of the resonant optical cavity.
Figure 6B:
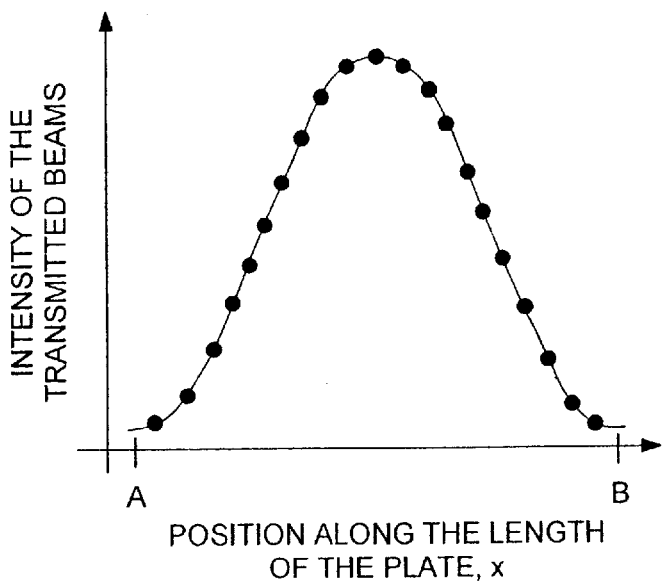
FIG. 6b is a graph illustrating light intensity distribution emerging from a forward reflective surface of the resonant optical cavity.
Figure 6C:
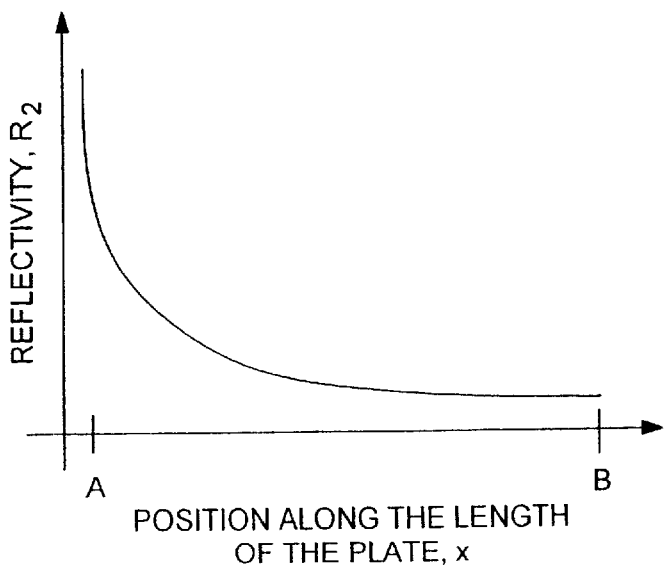
FIG. 6c is a graph illustrating variation in reflectivity of a forward reflective surface against position on the forward reflective surface of the resonant optical cavity.

Referring again to FIG. 5, the different sets of sub-beams 63 exiting the forward reflective surface 64 have an exponential intensity distribution as shown in FIG. 6a. It is preferred that the different sets of sub-beams 63 exiting the forward reflective surface 64 have a Gaussian intensity as shown in FIG. 6b. The Gaussian intensity of different sets of sub-beams 63 exiting the forward reflective surface 64 is provided for by the forward reflective surface 64 of the resonant optical cavity 60 which has a graded reflectivity, a graded reflective surface, as shown in FIG. 6c. Referring to FIG. 5 and FIG. 6c, it is preferred that point A, a first point, on the forward reflective surface 64 has a relative high reflectivity. The reflectivity of the forward reflective surface 64 decreases exponentially from point A to point B, a second point; point B has a relative low reflectivity. As the beam follows the zigzag path from the first point to the second point the reflectivity of the graded reflective surface decreases exponentially.

Figure 7:
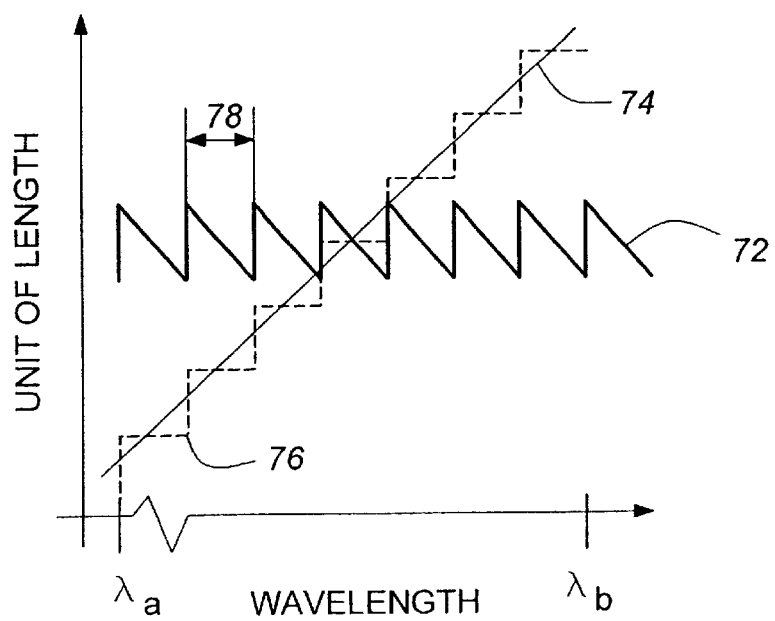
FIG. 7 illustrates graphically a combination of a dispersion plot for the resonant optical cavity with a dispersion plot for a second routing device to produce a substantially flat output response within a passband thereof without producing local maxima, ripples, within the passband.

In contrast to FIG. 3, which illustrates dispersion of light in a prior art frequency routing device, FIG. 7 illustrates dispersion of light in a routing device of the present invention. The discontinuities within each passband described in FIG. 3 have been removed. Since, the first routing device provides a spatially continuous output across an output "port" or region thereof, the graph of the response of the device is continuous across a free spectral range thereof. This results in reduced ripples in the passband.

Referring to FIG. 7, shown are theoretical dispersion plots 72, 74 and 76 illustrating position of light in unit of length versus wavelength. The dispersion plot 72 is for the resonant optical cavity 60 having a free spectral range and a wavelength dispersion response defining a saw-tooth wavelength dependent transmission function. Spacing 78 between points of adjacent teeth defines the channel spacing of the second device. In contrast to the dispersion plot 32 of FIG. 3, within each tooth there are no steps generated by the resonant optical cavity 60; a continuous output response across a free spectral range is shown. When an MMI phasar is used in place of the resonant optical cavity 60, only small steps within each tooth are produced. The plot 74 is a dispersion plot of a second device that has a wavelength channel spacing approximately equal to the free spectral range of the resonant optical cavity 60. It is evident from FIG. 7 that the second device provides a linear wavelength dispersion, and the first device provides a saw-tooth wavelength dependent transmission function. A combination of plots 72 and 74 results in step function dispersion plot 76. It is evident to one skilled in the art that the step function dispersion plot 76 represents a device with a substantially flat output spectral response within each channel.

Figure 8A:
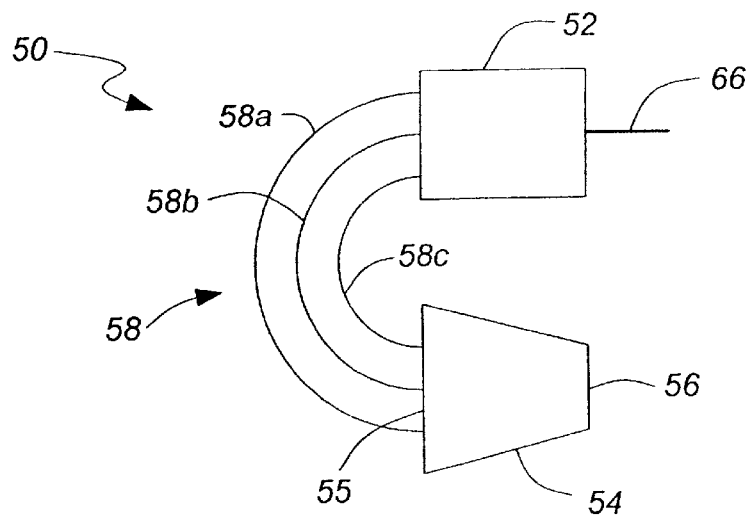
FIG. 8a is a schematic illustration of an MMI-phasar multiplexer.

U.S. Pat. No. 5,689,597 entitled "Multimode Interference Couplers and Method Therefor" issued Nov. 18, 1997 to Pierre-Andre Besse discloses "butterfly" and "inverted butterfly" shaped MMI couplers (multimode interference couplers). The MMIs that are taught in U.S. Pat. No. 5,689,597 comprise two MMIs integrated together having a non-conventional MMI shape. In contrast to the "butterfly" and the "inverted butterfly" MMIs disclosed in the present invention uses an isolated tapered MMI to concentrate sub-beams. FIG. 8a illustrates another possible embodiment for the firstrouting device of the present invention. Here, an MMI-phasar is shown. Theoretically, images of light received at the input ports are formed at distinct locations on an output "port" or region thereof. Since portions of the light passed from the first routing device to the second routing device and imaged at an output port thereof originate from a plurality of distinct locations, mode mismatch occurs. In order to reduce this mode mismatch, the distinct locations are closely spaced. This effectively reduces local maxima within the passband resulting from mode mismatch effects.

Referring to FIG. 8a, an MMI-phasar 50 is shown which according to the present invention is optically coupled to a second routing device. However, for ease of explanation the MMI-phasar 50 is described below without a second routing device. The MMI-phasar 50 functions as a highly dispersive array comprising: a first multimode interference (MMI) coupler 52 having an input port 66; a second multimode interference coupler 54 having an output port 56; and a waveguide array 58 optically coupling the first multimode interference (MMI) coupler 52 to second multimode interference coupler 54. Alternatively, in place of the first multimode interference (MMI) coupler 52 an optical splitter is used. It is within the scope of the invention for one or more arms of the waveguide array 58 to have a phase shifter for changing the relative optical path length of the arms. By having one or more arms with a phase shifter, it is possible to tune the MMI-phasar 50 or for the MMI-phasar 50 to function as a switch. Phase shifting in optical waveguides is well known. Changing the optical path length of the light medium perturbs the phase of a beam of light passing through the medium. Many phase shifting effects may be exploited in the design of MMI-phasars, for example, temperature, electro-optic effects, and stress within a medium; information pertaining to phase shifting effects is presented in Nishihara, et al. in "Optical Integrated Circuits". New York: McGraw-Hill, 1989, ch. 5. Commonly a heater electrode deposited on top of a waveguide arm is used to heat the waveguide arm thereby providing a thermally induced phase shift.

In operation, a multi-wavelength beam of light is launched into the input port 66. The first multimode interference (MMI) coupler 52 splits the beam of light and the split beam of light propagates into the waveguide array 58. The split beam of light is guided by the waveguide array 58, which induces relative phase delays proportional to length differences between waveguide array arms 58a, 58b and 58c. The second multimode interference coupler 54 distributes light from the arrayed waveguide grating to its output port 56. The lengths of the array arms 58a, 58b and 58c are selected so that interference occurs within the device to produce sub-beams emerging from the output port 56 of the second multimode interference coupler 54. The sub-beams exit the output port 56 at locations dependent upon frequency components of the sub-beams. In an embodiment, the sub-beams emerging from the output port 56 of the second multimode interference coupler 54 are unguided and propagate towards and enter an input port of a second routing device. In another embodiment, the sub-beams emerging, from the output port 56 of the second multimode interference coupler 54 enter simultaneously into an input port of a second routing device.

The second multimode interference coupler 54 comprises an input face 55 and an output face including the output port 56. In a preferred embodiment, the input face 55 is longer than the output face such that the second multimode interference coupler defines a tapered shape as further discussed in FIG. 8b. The taper serves to concentrate sub-beams emerging from output port 56 thereby yielding concentrated sub-beams 69. In effect, the tapering results in peaks of the output transmittance response of the MMI being closer together. Achieving this same result using waveguides is possible, but has some known disadvantages. For example, there is a large crosstalk between waveguides disposed near one another.

It is preferred that the waveguide array 58, as shown, has three waveguide arms 58a, 58b, and 58c. Alternatively, the waveguide array 58 has two arms. It is possible for the waveguide array 58 to have any number of waveguide arms. However, it is preferred that the waveguide array 58 has less than six waveguide arms.

The waveguide array 58, as shown, defines an arc having a first end and a second end, the first multimode interference coupler 52 optically coupled to the first end of the waveguides and the second multimode interference coupler 54 optically coupled to the second end of the waveguide array. In this embodiment, the arc serves to reduce the area occupied by the MMI-phasar 50. A reduction of the area occupied by an integrated component reduces manufacturing costs and fabrication tolerances of the integrated component. It is possible to nestle the MMI-phasar 50 amongst other optical components.

In an alternative embodiment of the invention, as stated above, it is possible for the routing arrangement shown in FIG. 8a to be tunable. If the waveguides 58 of the MMI-phasar 50 have substantially a same length, there is no induced relative phase difference between the signals propagating therein. Since the phase difference between the signals is zero, the location of a signal on the output port 56 of the second multi mode interference coupler 54 will remain stationary. If at least all but one of the waveguides 58 is provided with a phase shifter for selectively shifting an optical path length of the waveguide by a predetermined amount to impart a relative phase shift to the signals propagating therein, the location of the resulting signal on the output port 56 of the second multimode interference coupler 54 is alterable in a predetermined fashion. Moreover, by preselecting the location of the signal in this manner, the center wavelength of maximum transmission is preselected, thus providing tunability. As one of ordinary skill in the art will recognize, the phase shifter provided in one waveguide arm of a Mach-Zehnder Interferometer may be chosen from among a variety of different phase shifters. In another embodiment of a tunable first routing device, the MMI-phasar 50 is tuned by changing the global temperature of the MMI-phasar 50.

Figure 8B:
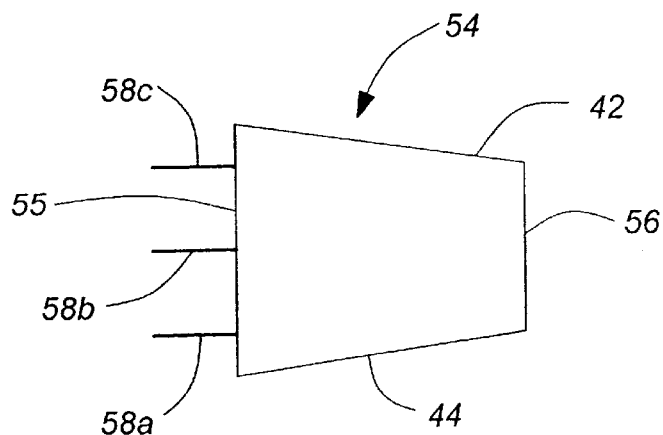

Referring to FIG. 8b, a tapered multimode interference coupler 54 is shown comprising two faces and two sides: an input face 55 having input ports optically coupled to waveguide array arms 58a, 58b and 58c; an opposing face to the input face 55 including the output port 56; and two opposing sides 42 and 44. The opposing sides 42 and 44 define a taper therebetween. The input face 55 and output port 56 are substantially flat and parallel to one another. The two opposing sides of the taper 42 and 44 are of substantially equal length and straight. Light emerging from the waveguide array arms 58a, 58b and 58c is funneled into the tapered multimode interference coupler 54 thereby imaging the light in a predetermined fashion prior to it exiting the output port 56. As one skilled in the art will appreciate it is possible to refer to the two faces as boundaries. The term boundary includes a transition between integrated and bulk optics and/or a delimitation between two integrated optical components, for example an MMI and a free space region. In this regard, the term face and boundary are used interchangeably.

Figure 8C:
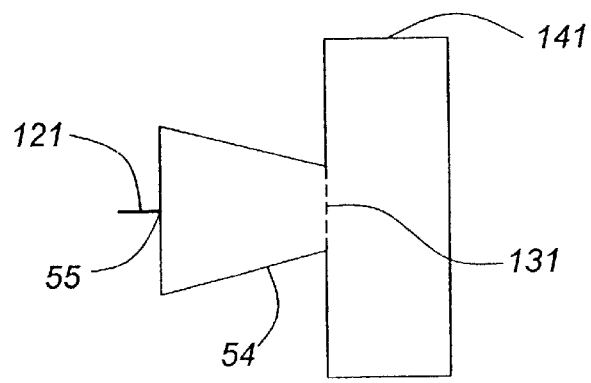
FIG. 8c is a schematic illustration of a tapered multimode integral to a multimode interference coupler.

Referring to FIG. 8c, a tapered multimode interference coupler 54 is shown integral to a multimode interference coupler 141. The tapered multimode interference coupler 54 having an input face 55 which is a first boundary comprising a first port 121 for receiving light and a second opposing boundary, indicated by dashed line 131. The second opposing boundary 131 is shorter than the first boundary forming a taper therebetween. The second opposing boundary 131 is adjacent and optically coupled to the multimode interference coupler forming a port for optical communication between the tapered multimode interference coupler 54 and the multimode interference coupler 141. The port having a common delimitation with the second boundary, as indicated by dashed line 131.

Figure 9:
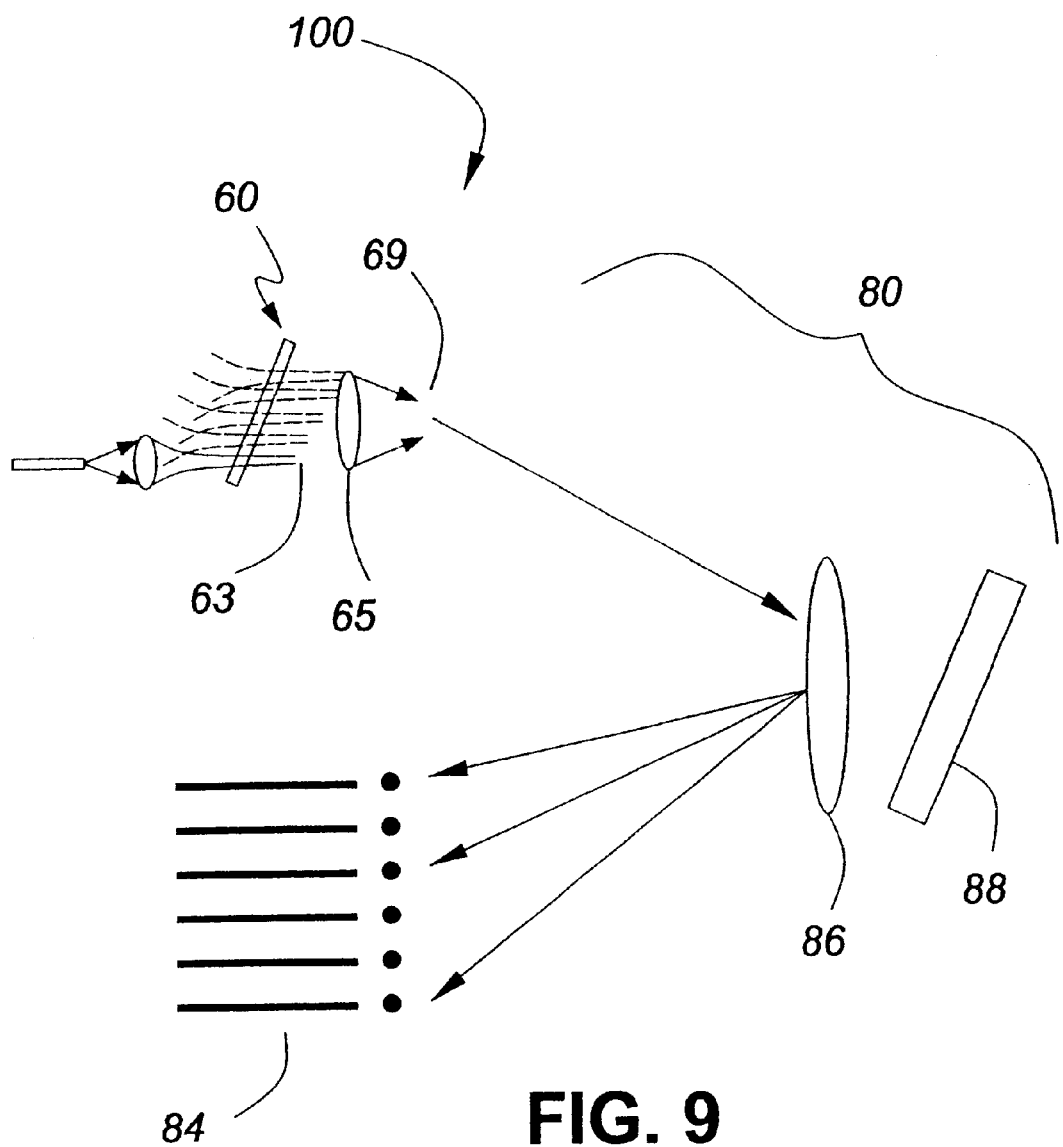
FIG. 9 is a schematic illustration of a resonant optical cavity in optical communication with a diffraction grating demultiplexer.

Referring to FIG. 9, a resonant optical cavity 60 is optically coupled to a diffraction grating demultiplexer 80 to provide a wavelength multipexer-demultiplexer 100 having an output transmissivity response including a substantially flat output response. The diffraction grating demultiplexer 80 is comprised of a collimating/focusing lens 86 and a diffraction grating 88.

In operation, the focused spectrum of sub-beams 69 are generated as described with reference to FIG. 5. The sub-beams 69 enter the collimating/focussing lens 86, which directs them towards a diffraction grating 88. In contrast to the intermittent light coupling induced by waveguides optically coupling the 1×2 frequency routing device 10 to the N×N frequency routing device 12 of FIG. 2, a substantially spatially continuous light coupling is provided. The sub-beams are incident on and diffracted by the diffraction grating 88. The diffracted sub-beams are guided by the collimating/focussing lens 86 yielding a plurality of light beams that are routed according to design requirements. The plurality of light beams are illustrated launched into a series of waveguides or optical fibers 84. The diffraction grating demultiplexer 80 does not have a distinct input port. However, the input port of the diffraction grating demultiplexer 80 is a known theoretical boundary. As explained above, the relationship between the free spectral range, $X_0$, of the resonant optical cavity 60 and the channel spacing S of the diffraction grating 88 determines, in part, the characteristics of a resulting output response within the passband.

Figure 10:
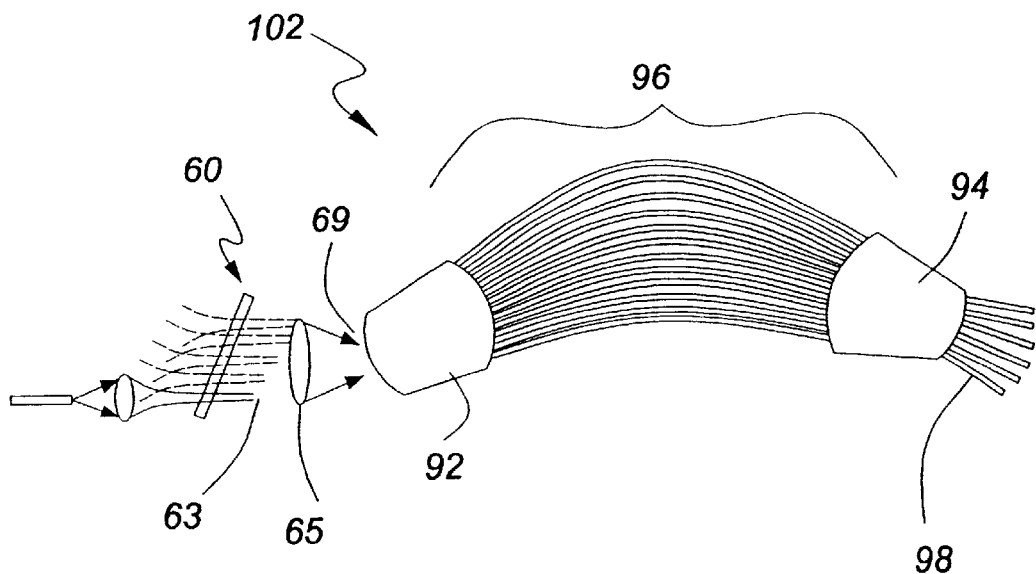
FIG. 10 is a schematic illustration of a resonant optical cavity according to the present invention in optical communication with an arrayed waveguide grating demultiplexer.

As will be evident to one skilled in the art it is possible for a lens to transpose an image about an axis of the lens. In.this regard, referring to FIG. 7, light emerging from a routing device defining a saw-tooth wavelength dependent transmission function is transposed upon passing through an imaging lens to an inverted saw-tooth wavelength dependent transmission function. One skilled in the art will easily be able to determine if an imaging lens is required between the first routing device and the second routing device in order to result in a desired output response. Referring to FIG. 10, a resonant optical cavity 60 is optically coupled to an arrayed waveguide grating demultiplexer 96 to provide a wavelength multiplexer-demultiplexer 102 having a substantially flat output response within its passband. The arrayed waveguide grating demultiplexer 90 comprises: a first free space region 92; a second free space region 94 having output ports 98; and an arrayed grating 96 optically coupling the first free space region 92 to the second free space region 94.

In operation, the focused sub-beams 69 are generated as described with reference to FIG. 5. The focused sub-beams 69 are launched into the first free space region 92 and routed via the arrayed grating 96 to the second free space region 94. Light beams emerging from the output ports 98 are routed according to design requirements. In a similar manner to the diffraction grating demultiplexer 80 of FIG. 8, the arrayed waveguide grating demultiplexer 96 does not have a distinct input port. However, the input port of the arrayed waveguide grating demultiplexer 96 defines a boundary. Of course, it is evident to those of skill in the art that the input port of the arrayed waveguide grating is a region or area into which light when launched results in light exiting from the output port with an output response as shown in plot 74 of FIG. 7.

Figure 11:
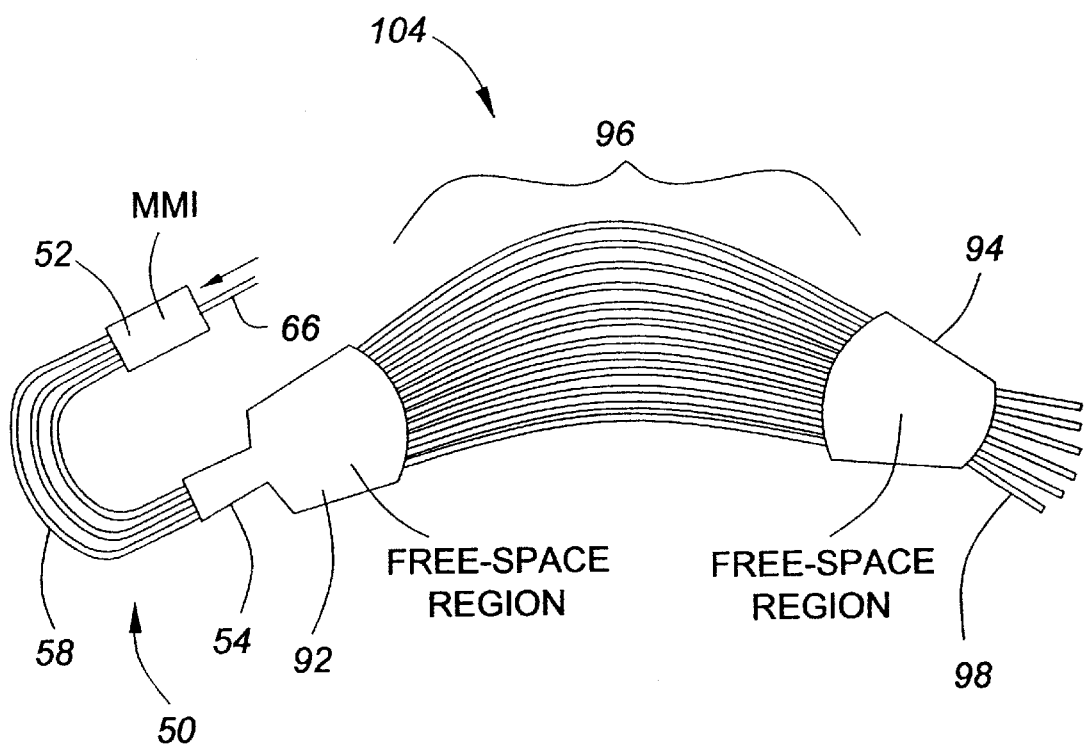
FIG. 11 is a schematic illustration of an MMI-phasar multiplexer in optical communication with an arrayed waveguide grating demultiplexer.

Referring to FIG. 11 the MMI-phasar 50 is optically coupled to an arrayed waveguide grating demultiplexer 96 to provide a wavelength multiplexer-demultiplexer 104 having a substantially flat output response within its passband with less ripple. The MMI-phasar 50 and the arrayed waveguide grating demultiplexer 96 are comprised as described with reference to FIG. 8 and FIG. 10 respectively.

The second multimode interference coupler 54 is integral with the first free space region 92 providing optical coupling between the MMI-phasar 50 and the arrayed waveguide grating demultiplexer 96. As is evident from FIG. 11 there is no distinct output port of the second multimode interference coupler 54 or input port of-the first free space region 92. The output port of the second multimode interference coupler 54 and input port of the first free space region 92 is a boundary. As detailed above, removing the limitation of distinct individual output ports in the first device when coupled to a second routing device, with the aforementioned characteristics, provides a device with a flat output response having less ripple than prior art devices within its passband.

Figure 12:
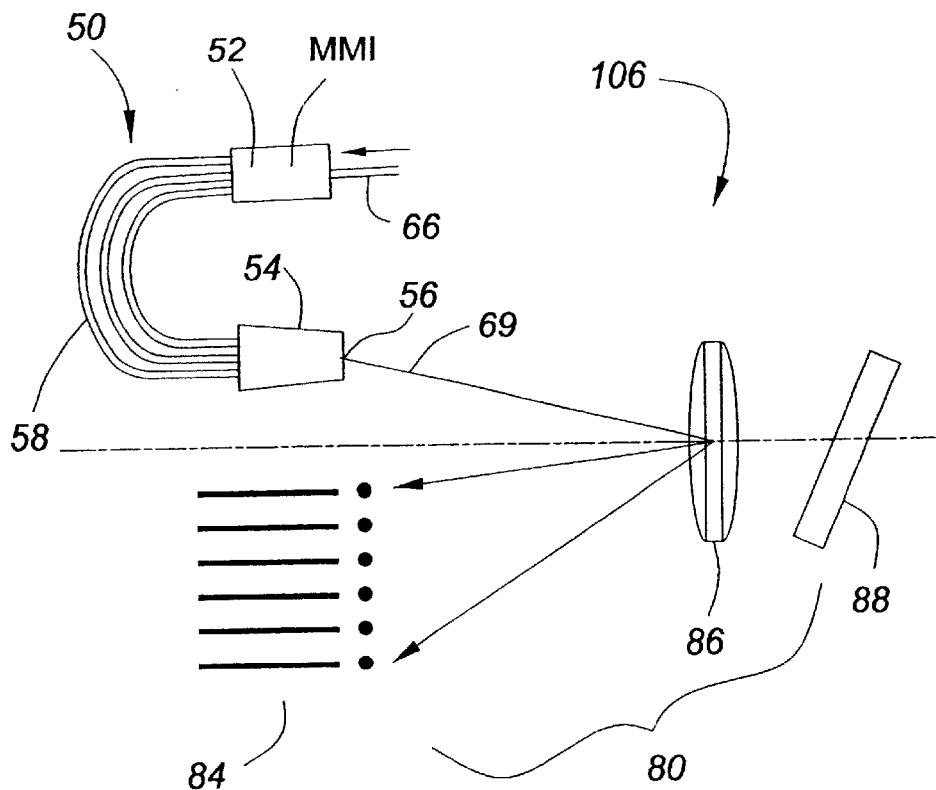
FIG. 12 is a schematic illustration of an MMI-phasar multiplexer in optical communication with a diffraction grating demultiplexer.

Referring to FIG. 12 the MMI-phasar 50 is optically coupled to a diffraction-grating demultiplexer 80 to provide a wavelength multiplexer-demultiplexer 106 having a substantially flat output response within its passband. The diffraction grating demultiplexer 80 is comprised as described with reference to FIG. 9.

In operation, a spectrum of focused sub-beams 69 emerges from the output port 56 of the second multimode interference coupler 54 as described with reference to FIG. 8. As described with reference to FIG. 9 the sub-beams enter the collimating/focussing lens 86, and the diffraction grating demultiplexer 80 functions in a similar manner to that described with reference to FIG. 9.

Figure 13:
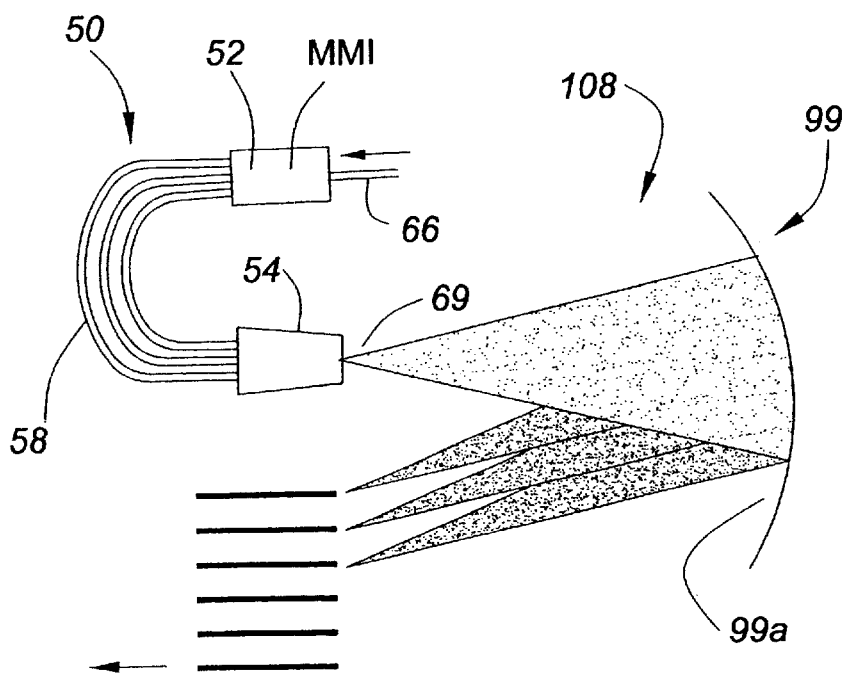
FIG. 13 is a schematic illustration of an MMI-phasar multiplexer in optical communication with a planar grating demultiplexer.

Referring to FIG. 13, the MMI-phasar 50 is optically coupled to a planar concave grating device 99. The planar concave grating device 99 comprises a concave diffractive surface. In operation, sub-beams emerge from the output port 56 of the second multimode interference coupler 54 in a similar fashion to that described with reference to FIG. 8. The sub-beams are unguided. They are incident on and diffracted by an inner surface 99a of the planar concave grating device 99. The planar concave grating 99 performs the combined function of the collimating/focussing lens 86 and the diffraction grating demultiplexer 88 of FIG. 12.

Nevertheless, from the above description it will be evident to one skilled in the art that the resonant optical cavity 60 or the MMI-phasar 50 need only be optically coupled to a second routing device having a channel spacing, S, approximately equal to the free spectral range, $X_0$, of the resonant optical cavity 60 or the MMI-phasar 50. And by having a substantially spatially continuous light coupling between the two routing devices ripple in the substantially flat output response within the passband is reduced.

Theoretical Examples

The following non-limiting examples give typical parameters for a resonant optical cavity of the present invention.

Example 1

A resonant optical cavity functioning as a highly dispersive virtually-imaged phased array having a free spectral range of 100 GHz The resonant optical cavity has a rearward reflective surface and a forward reflective surface with a light transmissive plate of thickness 1002 µm and length less that 1 cm disposed therebetween. Launching a beam of light of wavelength 1550 nm into the resonant optical cavity at an angle θ of 4° yields a set of sub-beams of light emerging from the resonant optical cavity. The distance between adjacent sub-beams is 140 µm and the order of the resonant optical cavity, for a wavelength of 1550 nm is 1937.

The efficiency of the resonant optical cavity is 84% and it provides an angular dispersion of 0.8 degrees/nm. The resonant optical cavity is highly dispersive in comparison to 0.038 degrees/nm dispersivity obtained for a grating with a 27° blaze angle.

Example 2

A resonant optical cavity functioning as a highly dispersive virtually-imaged phased array having a free spectral range of 50 GHz The resonant optical cavity has a rearward reflective surface and a forward reflective surface with a light transmissive plate of thickness 2002.5 μm and length less that 1 cm disposed therebetween. Launching a beam of light of wavelength 1550 nm into the resonant optical cavity at an angle θ of 2° yields, a set of sub-beams of light emerging from the resonant optical cavity. The distance between adjacent sub-beams is 140 μm and the order of the resonant optical cavity, for the wavelength of 1550 nm is 3875.

The efficiency of the resonant optical cavity is 84% and it provides an angular dispersion of 1.5 degrees/nm. The resonant optical cavity is highly dispersive in comparison to a grating with a 27° blaze angle.

As is evident to those of skill in the art, the term unguided as used herein refers to light propagating through a medium or through free space, the light being unrestricted along at least one direction other than the direction of propagation a large planar area of waveguide material results in unguided light since the light is free to propagate therethrough and to spread in a lateral direction. Light propagating through a region of free space is unguided since it is capable of propagating in one direction and spreading in at least another lateral direction. Light within a waveguide or within a fiber is guided light.

Numerous other embodiments may be envisaged without departing from the spirit and scope of the invention.

What is claimed is:

1. A wavelength multiplexer-demultiplexer comprising:
    a first routing device having a first input port for launching a multi-wavelength beam of light having at least n wavelengths into the first routing device, wherein n is greater than 1, and a first output port for exiting sub-beams generated by the first routing device from the multi-wavelength beam of light, and having an output response with a free spectral range;
    a second routing device having a second input port for receiving sub-beams exiting the first output port, a second output port, and a spectral response for providing a wavelength channel spacing, the second input port optically coupled to the first output port to provide a light coupling absent substantial mode mismatch.

2. A wavelength multiplexer-demultiplexer according to claim 1, wherein the free spectral range provided by the first routing device is approximately equal to the wavelength channel spacing provided by the second routing device.

3. A wavelength multiplexer-demultiplexer according to claim 2, wherein the first routing device comprises a resonant optical cavity having a forward and a rearward spaced apart reflective surface; the first input port for launching a multi-wavelength beam of light having at least n wavelengths into the resonant optical cavity is such that the beam is incident upon one of the reflective surfaces of the resonant optical cavity at an angle that is non-orthogonal to said reflective surface, the forward reflective surface being partially transmissive, so that a portion of the beam exits the forward partially transmissive surface as sub-beams at a plurality of locations along the forward partially transmissive surface as the beam follows a zigzag path between the forward and rearward surfaces.

4. A wavelength multiplexer-demultiplexer according to claim 3, wherein the rearward reflective surface of the resonant optical cavity comprises a graded reflective surface such that reflectivity decreases along the rearward reflective as the beam follows the zigzag path from a first point to a second point on the rearward reflective surface.

5. A wavelength multiplexer-demultiplexer according to claim 4, wherein reflectivity of the graded reflective surface decreases exponentially from the first point to the second point.

6. A wavelength multiplexer-demultiplexer according to claim 3 comprising
    an optically transmissive material having a high thermooptic coefficient is disposed between the forward and the rearward spaced apart reflective surface; and,
    a temperature control for controlling the temperature of the resonant optical cavity.

7. A wavelength multiplexer-demultiplexer according to claim 3, wherein the second routing device comprises:
    a first free space region including the second input port;
    a second free space region including the second output port; and
    a plurality of waveguides of differing lengths forming an optical coupling between the first free space region and the second free space region.

8. A wavelength multiplexer-demultiplexer according to claim 3, wherein the second routing device comprises:
    a lens for collimating the sub-beams exiting the first routing device; and
    a grating for refracting the collimated sub-beams back through the lens.

9. A wavelength multiplexer-demultiplexer according to claim 3, wherein the second routing device comprises:
    a planar concave diffraction grating having an inner concave diffraction surface for refraction of the sub-beams exiting the first routing device, the planar concave diffraction grating disposed such that the sub-beams exiting the first routing device are incident on the inner planar concave diffraction surface.

10. A wavelength multiplexer-demultiplexer according to claim 9, wherein the planar concave diffraction grating comprises integrated optics.

11. A wavelength multiplexer-demultiplexer comprising:
    a first routing device comprising a first port and a second port, the first routing device having an output response with a free spectral range, wherein a portion of light launched into the first port exits the second port at a location dependent upon a wavelength of the portion of light, a plot of location versus wavelength substantially defining a saw tooth function; and
    a second routing device comprising an input port and an output port, the second routing device having a spectral response with a channel spacing approximately equal to the free spectral range, wherein
        the input port of the second routing device is optically coupled to the output port of the first routing device for routing unguided light from the second port of the first routing device to the input port of the second routing device.

12. A wavelength multiplexer-demultiplexer according to claim 11, further comprising a lens for imaging light disposed between the second port and the input port of the second routing device.

13. A wavelength multiplexer-demultiplexer according to claim 3, further comprising a lens for coupling light exiting from the partially transmissive forward surface of the resonant optical cavity to the second routing device.

14. A wavelength multiplexer-demultiplexer according to claim 3, wherein a solid light transmissive material is disposed between the forward and the rearward spaced apart reflective surface.

15. A wavelength multiplexer-demultiplexer according to claim 3, comprising an iris for sub-beams exiting the first routing device to pass through which limits passage of higher orders of light from the first routing device to the second routing device.

* * * * *